Sept. 1, 1925. 1,552,081
C. E. RETT
CUSHION TIRE
Filed Sept. 13, 1923
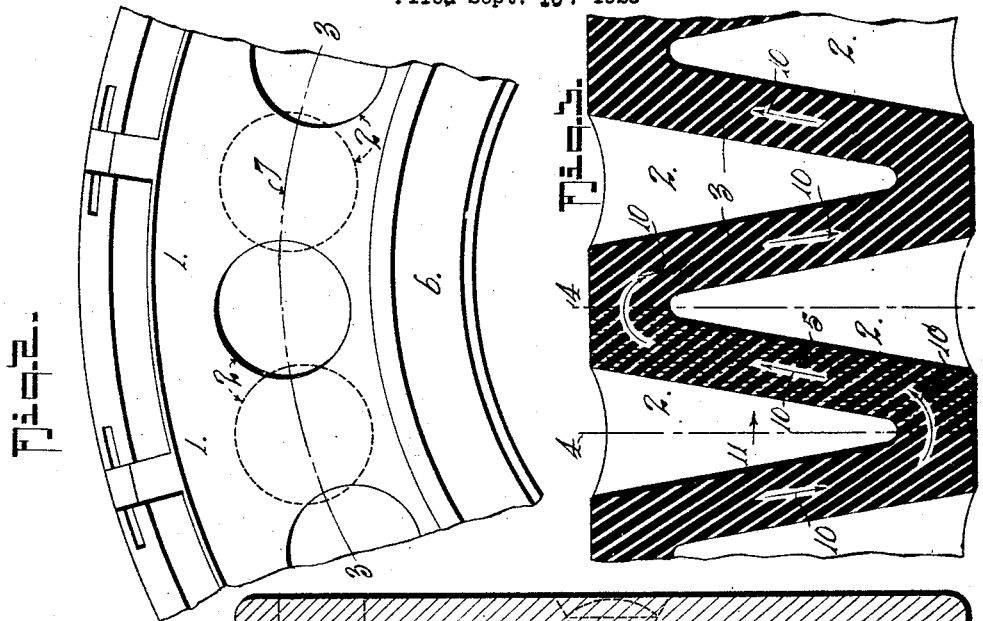
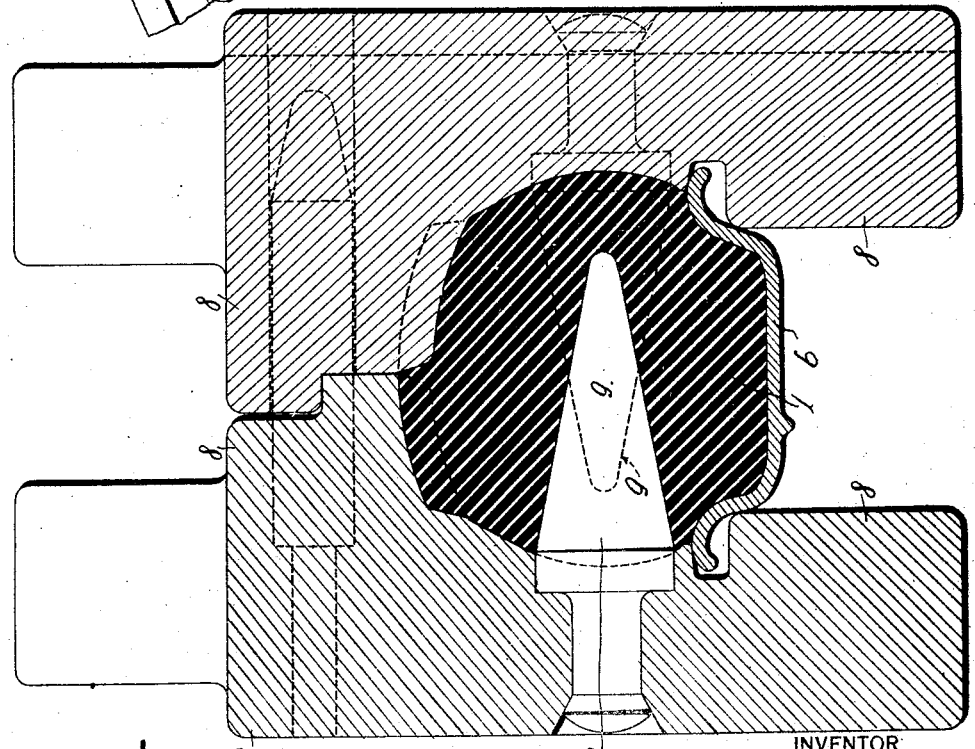
INVENTOR
Carl E. Rett.
BY
Albert E Dietrich
ATTORNEY Patented Sept. 1, 1925.

1,552,081

UNITED STATES PATENT OFFICE.

CARL E. RETT, OF AKRON, OHIO, ASSIGNOR TO LAMBERT TIRE & RUBBER CO., OF BARBERTON, OHIO, A CORPORATION OF ARIZONA.

CUSHION TIRE.

Application filed September 13, 1923. Serial No. 662,507.

*To all whom it may concern:*

Be it known that I, CARL E. RETT, a citizen of the United States, residing at Akron, in the county of Summit and State of Ohio, have invented certain new and useful Improvements in Cushion Tires, of which the following is a specification.

My invention relates to certain new and useful improvements in cushion tires and it primarily has for its object to provide a cushion tire of such construction that it will not only possess great resiliency, but will prevent side sway of the vehicle on which the tires are used.

Generically the invention comprises a tire of rubber having conical recesses entering from the opposite sides in staggered relation whereby the rubber walls between adjacent recesses will constitute a zig-zag weight supporting wall along the tire, the axes of adjacent recesses lying a distance apart less than the greatest diameter of the recess whereby the rolling line of contact pressure will be transmitted in radial planes in a zig-zag path from one side of the tire to the other and vice versa, the vehicle always riding as it were on air and rubber.

In its more detailed nature the invention also resides in those novel details of construction, combination and arrangement of parts, all of which will be first fully described, and then be specifically pointed out in the appended claims, reference being had to the accompanying drawings, in which—

Figure 1 illustrates my invention in the course of manufacture.

Figure 2 is a detail side elevation of a portion of my tire.

Figure 3 is a developed plan section on the line 3—3 of Figure 2.

In the drawing, in which like numerals of reference indicate like parts in all the figures, 1 is the tire body which may be composed of solid rubber or built up in the usual fashion and which is provided with two series of conical holes or recesses 2—2, one series entering from one side of the tire and the other series entering from the other side of the tire, the two series being staggered as best shown in Figure 3. The holes or recesses 2 preferably do not extend entirely through the tire but preferably extend three-quarters of the way through and their axes 4 are spaced apart a distance less than the greatest diameter of the holes 2, whereby the rubber walls 3 between adjacent holes 2 will be of such thickness that the tire will always be riding partly over air and partly over rubber. In other words the arrangement and proportioning of the holes is such that assuming the dot and dash line axis 4 at the left in Figure 3 to constitute the rolling line of contact of the edge of the radial plane to which the pressure thrusts of the tire is transmitted to the axes of the tire in rolling over the ground, the arrow 11 indicating the direction of the travel, the dotted lines 5 will indicate the solid rubber pressure area which, as will be seen, varies or shifts from one side of the tire to the other along the direction of the arrows 10 in Figure 3. This gives the effect of a lateral zig-zag action of the tire and counteracts the tendency of the tire to cause a side sway of the vehicle which sometimes occurs at high speeds with cushion tires or tires in which the holes go all the way through.

It will further be seen that by arranging the axes of the adjacent recesses 2 a distance apart less than the diameter of the recesses the weight will be riding partly over the recess and partly over the solid rubber wall between the recesses, or as it is known in the trade, the weight will be riding always partly over air and partly over rubber.

Furthermore the provision of the conical recesses with large openings as shown prevents the accumulation of mud and dirt in the recesses, the tendency of the tire action being to clear the recesses as the tire rolls along.

It will also be noted that the various axes of the recesses 2 all lie perpendicular to the same circumference 7, or substantially so, this being found to be the preferable arrangement in practice. 6 designates the rim of the wheel on which the tire is built and 8 indicates the usual mold having the cores 9 for the formation of the tire. As the mold structure forms no part of the present invention detailed description thereof is thought to be unnecessary.

By extending the recesses 2 approximately three-quarters the way through the tire the benefit of large air spaces is obtained and at the same time a substantially uniform rubber wall 3 is obtained throughout the entire zig-zag path indicated by the arrows 10.

From the foregoing description, taken in connection with the accompanying drawing, it is thought the construction, operation and advantages of the invention will be clear to those skilled in the art.

What I claim is:

1. A cushion tire having conical recesses extending inwardly from opposite sides in staggered relation with their axes spaced apart a distance less than the greatest diameter of the recesses, said recesses extending more than halfway through the tire, substantially as shown and described.

2. A cushion tire having conical recesses extending inwardly from opposite sides in staggered relation with their axes spaced apart a distance less than the greatest diameter of the recesses, said recesses extending substantially three-quarters the way through the tire.

3. A cushion tire having conical spaces extending inwardly from opposite sides in staggered relation with their axes spaced apart a distance less than the greatest diameter of the spaces, said spaces extending more than halfway through the tire.

CARL E. RETT.